Dec. 2, 1952  J. H. DUDLEY  2,619,881
MECHANICAL STRIP DEBURRING TOOL
Filed March 4, 1950
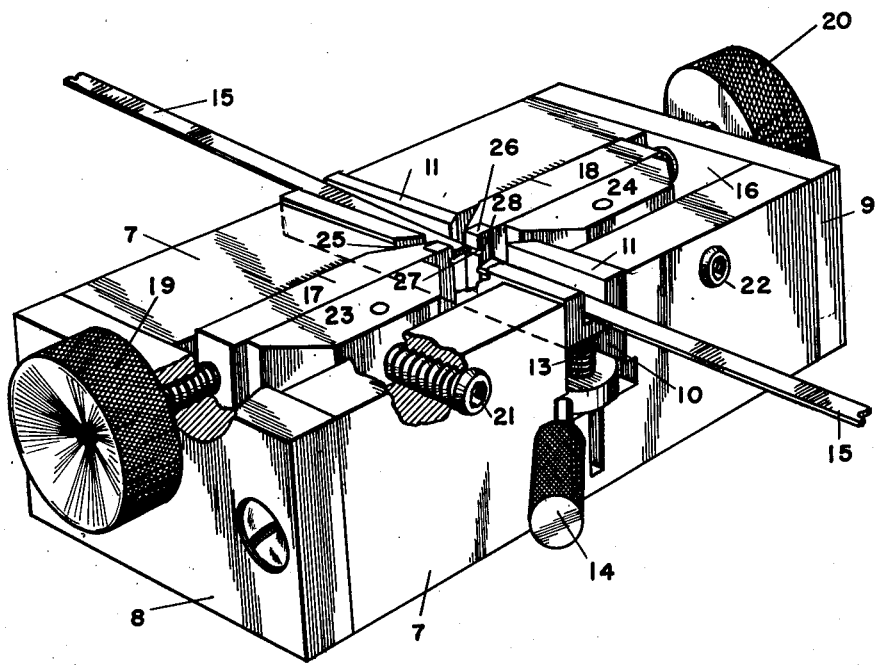
INVENTOR.
JOHN H. DUDLEY
BY
*M. N. Gould*
ATTORNEY Patented Dec. 2, 1952

2,619,881

UNITED STATES PATENT OFFICE 2,619,881

MECHANICAL STRIP DEBURRING TOOL

John H. Dudley, East Petersburg Heights, Pa., assignor to Hamilton Watch Company, Lancaster, Pa.

Application March 4, 1950, Serial No. 147,650

1 Claim. (Cl. 90—25)

This invention relates to a tool for mechanically deburring flat metallic and non-metallic strip materials and for maintaining edge shape and accurate size of said strip.

Precision metal working industries are finding more uses for flat, micro-thin sheets and strips of metallic and non-metallic materials which are produced on high precision rolling equipment. The widths of the as-rolled strip usually are wider than required for many applications, and it is necessary to produce a number of narrow width strips having accurate dimensions from the wider, as-rolled strip. This operation usually is accomplished by slitting the wide strip using a series of rotary knives on parallel arbors. The physical properties of this strip and the characteristics of the available slitting methods usually result in formation of more or less jagged and burred edges due to the tearing action of the knives. These sharp, ragged edges on the strip often are objectionable and must be removed and the strip brought to exact widths. Various processes such as grinding, buffing or electrolytic polishing have been devised for removing this burr. Grinding and buffing involves the use of an abrasive compound which may be objectionable, while electrolytic polishing effects all surfaces rather than only the ragged edges. With the conventional methods for deburring or edge conditioning strip, it is difficult or impossible to produce uniform results.

This invention is directed to a mechanical method of deburring the edges of strip, and at the same time shaping said edges to a desired contour while maintaining accurate size. Moreover, this deburring tool may be used as a single unit, or it may be operated with other similar deburring tools in tandem or multiple arrangements to reduce sizes as required in one pass. Finally, this deburring tool may operate on a continuous basis, thus achieving the economy of deburring long, continuous lengths of strip.

The object of the present invention is to provide a tool which can be used for the rapid and efficient deburring of strip and which will maintain very close control of the width of the strip.

A further object of the present invention is to provide a pair of sintered carbide or tool steel type cutters which may be accurately adjusted with regard to the passage of a flat strip between them so as to remove the burred edges from the strip and to accurately size the strip.

A further object of the present invention is to provide means for making rapid and accurate adjustment of the cutters and to provide easy means of interchanging said cutters.

A further object of the invention is to use cutters of such shape that the strip edges will conform to specified geometric shapes or contour.

A further object of the present invention is to provide a tool by means of which the cutters are adjusted microscopically so that the width of the strip may be controlled to within tolerances as close as $1/10,000$ of an inch.

With the foregoing and other objects in view, the invention resides in the novel arrangement and combination of parts and in the details of construction hereinafter described and claimed, it being understood that changes in the precise embodiment of the invention herein described may be made within the scope of what is claimed without departing from the spirit of the invention.

The invention is illustrated in the accompanying drawing in which the figure is a perspective view of the invention.

Referring particularly to the invention, a base or U-shaped block 5 has end plates 8 and 9. These plates together with the block form a well in which the deburring action takes place.

A groove or channel 10 extends transversely across the block at the center to receive a supporting saddle 11, which is vertically adjustable by screws 13 operated manually by handle 14. This saddle 11 has a central longitudinal groove slightly wider and deeper than the strip to be processed and is positioned by means of the screws 13 so that the strip 15 is delivered at the desired level.

A central well 16 in the block 5 intersects the transverse groove 10 and provides a housing for the cutters 17 and 18 respectively. These cutters are adjustable with regard to the strip by the thumb wheels 19 and 20 respectively and are securely locked in position by the screws 21 and 22 respectively pressing against the blocks 23 and 24. Each of the cutter holding blocks 17 and 18 are provided with sintered carbide or tool steel cutting inserts 25 and 26 having burr removing grooves 27 and 28, which are lapped to the desired shape required to remove the burrs and to obtain the desired contour of the edge.

By means of the microscopic screw adjustments 19 and 20, the cutter blocks 17 and 18 are positioned to remove the necessary amount of material from the strip 15 which is fed through the cutters by drums (not shown).

The inserts 25 and 26 formed with the semicircular grooves 27 and 28 are brazed or otherwise secured to the blocks 17 and 18 respectively. These blocks are easily replaced with other blocks having inserts of different size and shape. This permits a change of contour of the edge of the strip, making possible square edges, curved edges, or edges of any desired angles, or shape. The inserts are scribed with a reference line 29 which when observed against a scale 30 permits both cutters to be advanced toward the strip at exactly the same distance. This could be particularly advantageous where the cut is an angular one and the width of the smaller surface of the strip critical.

What is claimed is:

A burr removing tool for continuous metallic strip, comprising a substantially U-shaped base, end plates for said base, said base being formed with a transverse central slot, a supporting saddle for said metallic strip having a central cut out portion carried in said slot, screws mounted in said transverse slot and bearing against the underside of said saddle to provide vertical adjustment for said saddle, a pair of cutters mounted on said U-shaped base for sliding movement towards and away from said central cut out portion of the saddle to engage the edges of the strip carried by said saddle, means for adjusting said cutters relative to said metallic strip, a pair of wedging blocks engaging said cutters to hold them securely in adjusted position, and means for locking said wedging blocks in position.

JOHN H. DUDLEY.

REFERENCES CITED

The following references are of record in the file of this patent:

UNITED STATES PATENTS

| Number | Name | Date |
| --- | --- | --- |
| 956,871 | Ainsworth et al. | May 3, 1910 |
| 1,948,489 | Balke | Feb. 27, 1934 |
| 1,958,103 | Kelly | May 8, 1934 |
| 1,958,147 | Kelly | May 8, 1934 |
| 2,359,719 | Simpson | Oct. 3, 1944 |